UNITED STATES PATENT OFFICE.

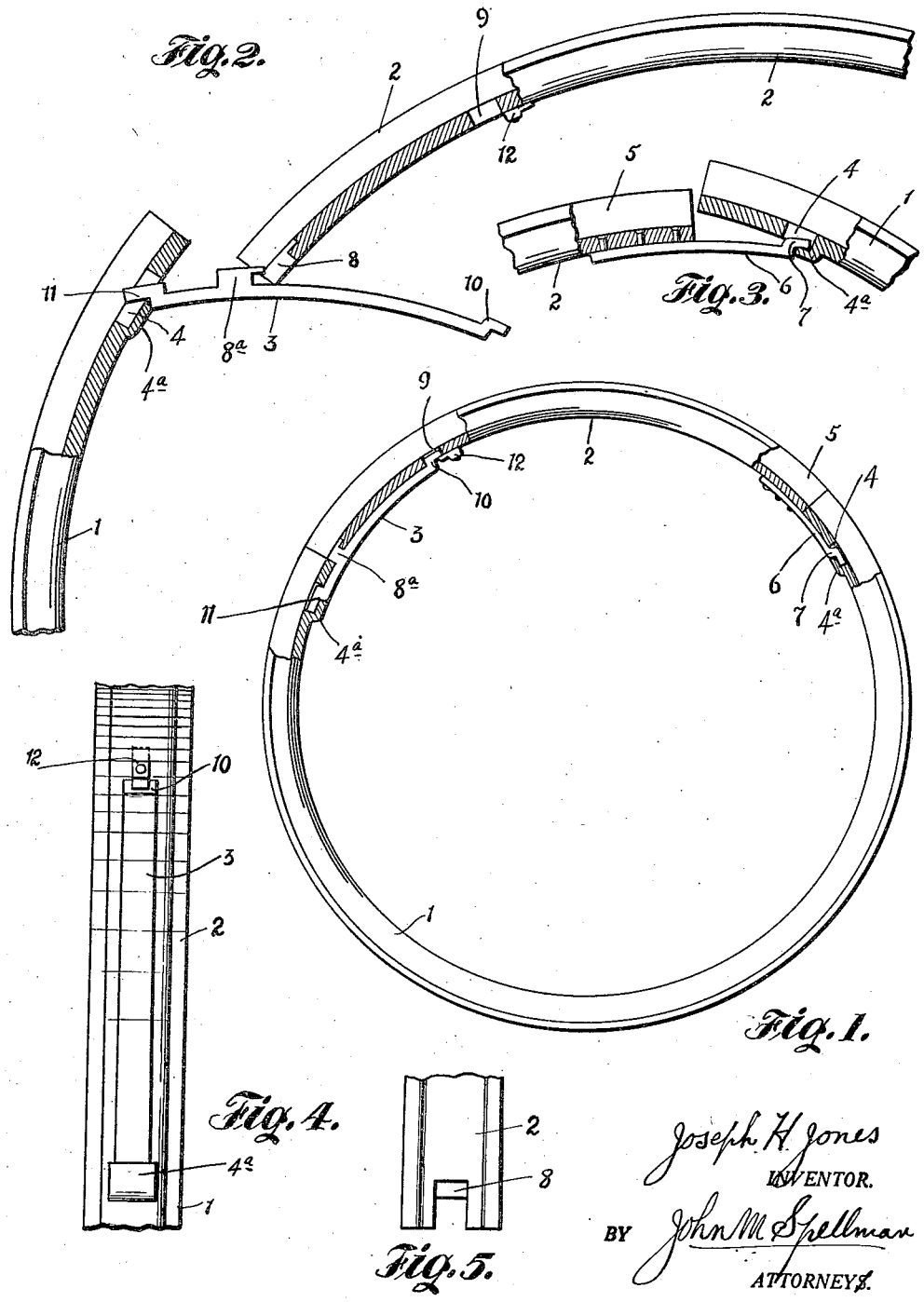

JOSEPH H. JONES, OF CLEBURNE, TEXAS.

DEMOUNTABLE TIRE RIM.

1,423,942.   Specification of Letters Patent.   Patented July 25, 1922.

Application filed September 18, 1919. Serial No. 324,525.

*To all whom it may concern:*

Be it known that I, JOSEPH H. JONES, a citizen of the United States, residing at Cleburne, in the county of Johnson and State of Texas, have invented certain new and useful Improvements in Demountable Tire Rims, of which the following is a specification.

My invention has relation to an improvement in rims for vehicle wheels and in such connection it relates more particularly to the rims of automobile wheels upon or from which resilient tires may be readily mounted or removed.

My present invention contemplates an improvement over Letters Patent No. 1,291,537 granted to me January 14, 1919, and has for its principal object to provide an automobile tire rim which is demountable and so constructed that when desired the segment may be removed from the rim and the tire easily taken off or replaced.

Another object is to provide a rim in three parts all of the parts being detachable from the rim and from each other, and finally to provide a rim of this description which is very durable, simply constructed and one which can be manufactured at little cost.

The nature and scope of my invention will be more fully understood from the following description, taken in connection with the accompanying drawing forming part hereof, in which—

Figure 1 is a side elevational view of the rim, the separable ends shown in longitudinal section.

Figure 2 is a side view of a portion of the removable segment, part of the rim and the metallic link or bar for securing the removable segment in position, the view partly in longitudinal section.

Figure 3 is a detail view of one end of the detachable segment, it being the end opposite to that shown in Figure 2, and a portion of the rim, illustrating the manner of fastening the segment to one end of the rim.

Figure 4 is an underneath detail plan view of a section of the rim, showing the metallic link in locked position, and Figure 5 is a detail view taken from the top of one end of the removable segment, it being the locking end illustrated in Figure 2.

Referring to the drawings, 1 represents the principal part of the rim, 2 the removable segment and 3 a metallic link or bar for securing the segment in position. Each end of the rim body 1 has a socket 4, the socket having a lip 4ª to interlock with the end 7 of a plate 6 attached to one end 5 of the segment 2, which plate may if desired be formed integral with the segment instead of being attached by screws as shown.

On the opposite end of the segment 2 is a socket 8 which fits or interlocks with a projection 8ª on the metallic link 3. A socket 9 is countersunk in the segment 2 a short distance from the center thereof to receive the inner end 10 of the link 3, the outer end of this link interlocking with the socket 4 in the rim body 1. It will be noted that the inner end 10 of the link 3 is smaller than the outer end 11, and a button 12 holds the end 10 in the socket 4, thus securely locking the three parts of the rim together.

The segment 2 may be removed from the rim by releasing the button 12 and removing the link 3 from engagement with the sockets 4, 8 and 9.

Having thus described the nature and scope of my invention, what I claim as new and desire to secure by Letters Patent, is—

A demountable tire rim, comprising a main circular portion, a segment, and a link member; said circular portion having a socket on each end with a lip overhanging the socket; said segment having an arm projecting from one end and provided with an angular flange adapted to be conformably received into and engage with one of said sockets on the circular portion; the opposite end of the segment having a socket with an inwardly extending recess and a socket set inwardly therefrom; said link having angular projections on each end and an intermediate projection, said projections adapted to be conformably received into the sockets in the rim and segment and means for locking the link and segment in position.

In testimony whereof I have signed my name to this specification.

JOSEPH H. JONES.